United States Patent [19]

Chory

[11] Patent Number: 5,189,929
[45] Date of Patent: Mar. 2, 1993

[54] SYSTEM AND METHOD FOR TRANSMISSION GEARBOX NOISE CONTROL UTILIZING LOCALIZED OIL COOLING/HEATING

[75] Inventor: Anthony G. Chory, Trumbull, Conn.

[73] Assignee: United Technologies Corporation, Hartford, Conn.

[21] Appl. No.: 848,515

[22] Filed: Mar. 9, 1992

[51] Int. Cl.[5] .................... F16H 57/02; F16H 37/06; F01M 1/00

[52] U.S. Cl. .................... 74/606 A; 74/606 R; 74/665 A; 74/665 B; 74/467; 184/6.12; 184/6.26; 184/6.18

[58] Field of Search ... 74/606 R, 606 A, 665 A–665 E, 74/467; 184/6.12, 6.26, 6.18

[56] References Cited

U.S. PATENT DOCUMENTS

| | | | |
|---|---|---|---|
| 3,529,698 | 9/1970 | Nelson | 184/6.12 |
| 3,625,310 | 12/1971 | Herrick | 184/6.12 |
| 4,429,587 | 2/1984 | Finn et al. | 184/6.12 |
| 4,506,509 | 3/1985 | Kronogard | 74/665 A |
| 4,520,848 | 6/1985 | Lucian et al. | 184/6.26 X |
| 4,573,373 | 3/1986 | Shimizu et al. | 184/6.12 |
| 4,667,774 | 5/1987 | Roberge | 184/6.12 |
| 4,683,985 | 8/1987 | Hultgren | 184/6.18 |
| 4,721,185 | 1/1988 | Weigle | 184/6.12 |
| 4,872,502 | 10/1989 | Holzman | 74/467 X |
| 4,879,921 | 11/1989 | Asada et al. | 74/467 |
| 5,053,661 | 10/1991 | Kitamura et al. | 74/467 X |
| 5,115,887 | 5/1992 | Smith | 184/6.12 X |
| 5,121,815 | 6/1992 | Francois et al. | 184/6.12 X |
| 5,135,442 | 8/1992 | Bossler | 74/665 B |

FOREIGN PATENT DOCUMENTS 4010333 10/1990 Fed. Rep. of Germany ........ 74/467
2180603 4/1987 United Kingdom ................. 74/467

OTHER PUBLICATIONS

New Engines have Novel Lubrication System, Industrial Lubrication, Jul. 1968, pp. 236–238.

Primary Examiner—Vinh T. Luong
Attorney, Agent, or Firm—Terrance J. Radke

[57] ABSTRACT

A transmission gearbox noise control system is operative during normal operations of a transmission system to effectively null temperature variations among selected localized areas of the transmission gearbox housing by utilizing oil jets for cooling/heating thereof, thereby reducing or eliminating differential thermal expansion effects or minor manufacturing errors among such localized areas wherein transmission vibration levels (noise) emanating from the gearbox are abated. The system includes one or more metering valves, a spray rod mounted in combination with each metering valve, an oil reservoir, a fluid pathway for fluidically interconnecting each metering valve to the oil reservoir, at least one pump for circulating oil through the fluid pathway, and a regulating subsystem that is automatically or manually operative to initiate/terminate the operation of each metering valve, to regulate the rate of fluid flow therethrough, and/or to adjust the impingement pattern of the fluid jet discharged therefrom. Each metering valve is mounted in combination with the gearbox housing so that the corresponding spray rod is orientated to discharge the fluid jet to impinge upon a predetermined target area of the gearbox housing. The predetermined target area is an internal, localized wall region of the gearbox housing adjacent the structural members that support the transmission gearing.

7 Claims, 4 Drawing Sheets

SYSTEM AND METHOD FOR TRANSMISSION GEARBOX NOISE CONTROL UTILIZING LOCALIZED OIL COOLING/HEATING

RELATED APPLICATION

The present application is related to commonly-owned, co-pending patent application Ser. No. 07/848,623 filed on Mar. 9, 1992, entitled HELICOPTER NOISE REDUCTION THROUGH GEARING MODIFICATIONS.

FIELD OF THE INVENTION

The present invention is directed to systems and methods for reducing noise levels resulting from transmission vibrations, and more particularly, to a system and method for abating undesirable noise levels generated by transmission gearboxes through selective control of the differential thermal expansion of the gearbox housing utilizing oil jets for localized cooling/heating of the gearbox housing. The system and method of the present invention has particular utility in abating main transmission gearbox noise generation in helicopters incorporating centralized bull gear/bull pinion gearing.

BACKGROUND OF THE INVENTION

Noise control is a primary concern for the transmission design engineer, and particularly so in the design of helicopter main transmission gearboxes. Excessive vibrations generated by transmission gearboxes typically result in undesirable noise levels in helicopter cockpits and/or cabins, which causes operator/passenger aural discomfort. Cabin and/or cockpit noise abatement is a particular concern in helicopters wherein the final stage of reduction gearing of the main transmission comprises one or more bull pinions interacting with a central bull gear (as opposed, for example, to helicopter main transmissions wherein the final stage of reduction gearing comprises epicyclic gearing).

For example, Sikorsky helicopters of the S-76® (S-76 is a registered trademark of the Sikorsky Aircraft Division of United Technologies Corporation) series, e.g., S-76A, S-76B, S-76C, have a main transmission that includes three stages of reduction gearing: a first stage for each engine output consisting of helical gearing, an intermediate stage consisting of spiral bevel gearing, and a final reduction stage comprising a central bull gear that intermeshes with right and left hand bull pinions (to combine the inputs of the two engines that provide the motive power for S-76® helicopters). Research has shown that the cockpit and/or cabin noise levels of S-76® helicopters are primarily the result of vibrations originating in the main transmission gearbox.

Figure 1:
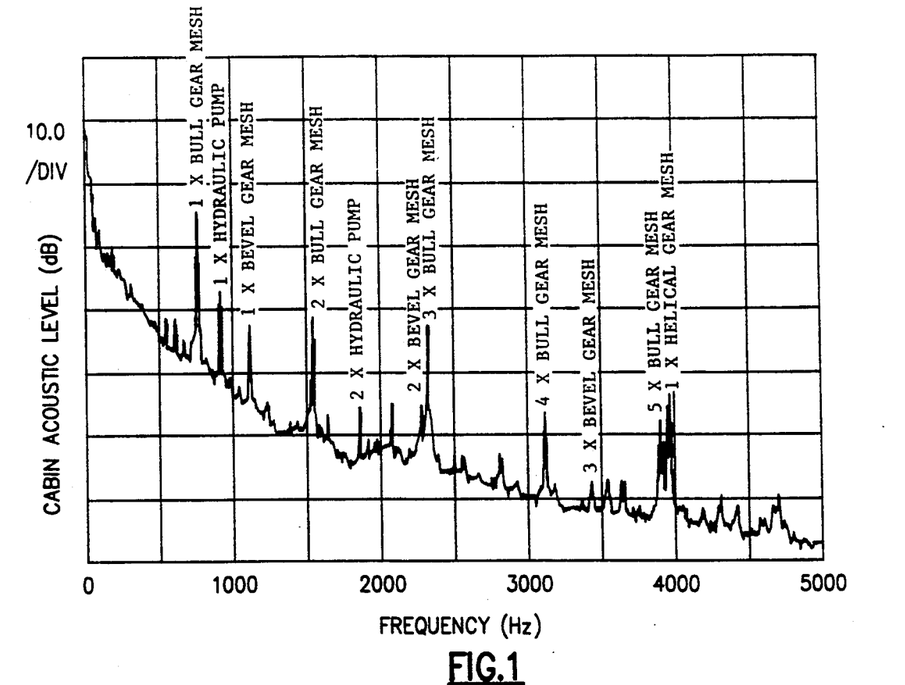
FIG. 1 is a graph illustrating the frequency components of the noise generated by vibrations from an S-76 main transmission gearbox.

A-weighted octave levels and overall DBA levels recorded in the cockpits and/or cabins of S-76A, S-76B, and S-76C helicopters indicate that interior noise levels are predominately the result of vibrations occurring at the bull gearing meshing frequency of 778 Hz, as illustrated in FIG. 1. The vibrations produced by the first and second reduction stages of S-76® main transmission gearboxes, i.e., the noise levels generated by the helical and spiral gearing as illustrated in FIG. 1, occur at higher frequencies and typically are not significant relative to the dominant noise levels produced by the fundamental and first few harmonics of the bull gearing meshing vibrations.

The low frequency gearbox vibrations resulting from bull gearing meshing are coupled into the helicopter airframe via the transmission gearbox housing. The resultant airframe vibrations generate noise in the helicopter cockpit and/or cabin. Such low frequency noise generally cannot be effectively abated by acoustic treatment of the cockpit and/or cabin interior, and therefore, effective noise control solutions must be implemented at the noise source, i.e., the main transmission gearbox.

Figure 2:
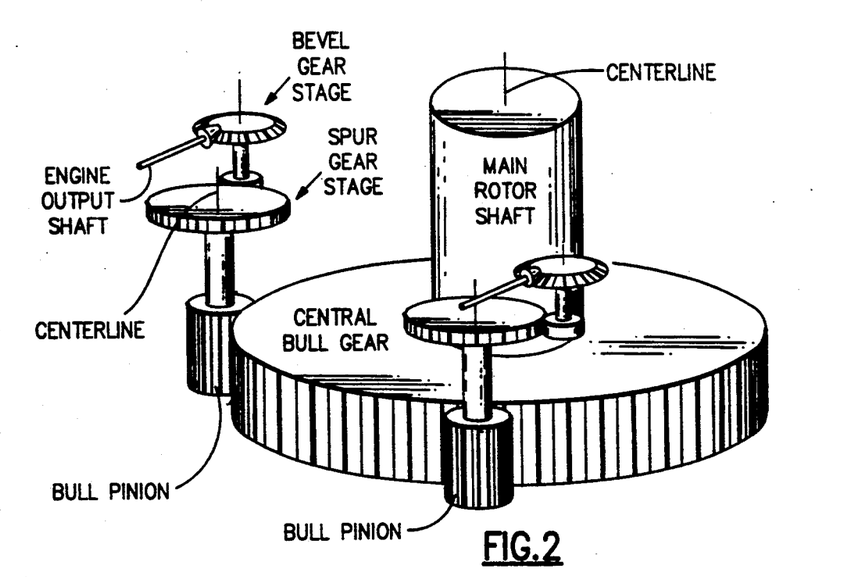
FIG. 2 is a schematic representation of an exemplary three stage main transmission gearbox depicting the meshing interaction between the central bull gear and two bull pinions.
Figure 2A:
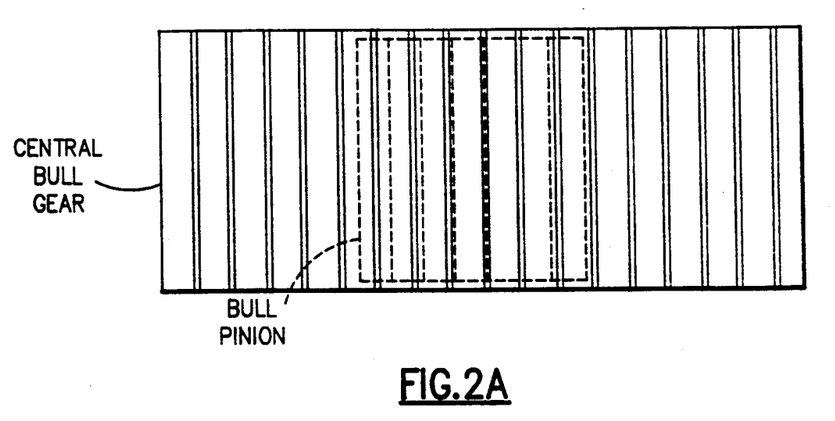
FIG. 2A illustrates an idealized meshing interaction between the central bull gear and a bull pinion of FIG. 2.

To effectively abate such low frequency noise, it is necessary to identify the primary causal factor(s) of bull gearing vibrations. The vibrations generated by the aforedescribed helicopter main transmission gearboxes are produced predominately by meshing between misaligned bull gearing, i.e., the central bull gear and bull pinion(s). FIG. 2 is a schematic representation of an exemplary three stage main transmission that depicts the meshing interaction between the central bull gear and two bull pinions. FIG. 2A illustrates the idealized intermeshing relationship between the central bull gear (illustrated by full lines) and a bull pinion (illustrated by dashed lines) wherein respective bull gear and bull pinion teeth engage completely and simultaneously across corresponding faces.

Previous efforts to reduce the noise levels generated by intermeshing between misaligned bull pinions and the central bull gear included lead correction modifications and modifications in effective bull gear tip relief. While such modifications resulted in some reduction in bull gearing vibrations, the resultant reduced interior noise levels of S-76® helicopters were adjudged to still present an unacceptable level of aural discomfort.

A need exists to more fully identify the design and operating parameters that cause main transmission gearbox vibrations, and in particular, S-76® main transmission gearbox vibrations. An effective solution for noise abatement can only be implemented based upon the identification and understanding of the causal parameter(s) of main transmission gearbox vibration generation.

SUMMARY OF THE INVENTION

One object of the present invention is the abatement of undesirable noise levels generated by vibrations emanating from main transmission gearboxes.

Another object of the present invention is the reduction of vibration levels generated by transmission gearboxes due to mismeshing gearing.

Yet another object of the present invention is to prevent gearing mismesh by the selective control of the differential thermal expansion of localized areas of transmission gearbox housings.

Still another object of the present invention is the selective control of the differential thermal expansion of localized areas of gearbox housings by selective cooling/heating of the gearbox housing.

One more object of the present invention is the utilization of oil jets for cooling/heating of selected localized areas of the gearbox housing.

These and other objects of the present invention are provided by a transmission gearbox noise control system that is operative to abate interior noise levels caused by transmission gearing vibrations resulting from differential thermal expansion of the transmission gearbox housing. A research program was conducted by Sikorsky Aircraft to provide a more fundamental understanding of the effects of the design and operating parameters of an S-76® main transmission gearbox vis-a-vis bull gearing vibration generation. Test data from this program indicates that operating temperature has the most significant impact on main transmission gearbox vibration generation. Test results indicate that bull gearing vibration levels increase approximately 0.1 dB per degree Celsius increase in oil-in temperature to the transmission gearbox.

Further test data indicates that the gearbox housing experiences thermal expansion/deflection effects due to temperature variations among localized areas of the transmission gearbox housing. This data indicates that temperature variations of about 0° C. to about 4° C. exist across localized areas of the upper casing of the gearbox housing, that temperature variations of about 0° C. to about 5° C. exist across localized areas of the lower casing of the gearbox housing, and that temperature variations of about 0° C. to about 8° C. exist for corresponding localized areas between the upper and lower casings of the gearbox housing.

Such temperature variations across and between localized areas of the upper and lower casings of the gearbox housing produce differential thermal expansion effects in and between the upper and lower casings of the gearbox housing. Differential thermal expansion effects, i.e., growth, deflections, in and between the upper and lower casings of the gearbox housings induce spatial misalignments between the central bull gear and the corresponding bull pinion(s) of the transmission. These spatial misalignments result in mismeshing between such gearing, which causes increases in bull gearing vibration levels.

The transmission gearbox noise control system of the present invention is operative to mitigate gearbox housing differential thermal expansion effects, i.e., to reduce or eliminate temperature variations among respective localized areas of the gearbox housing. Effectively nulling such temperature variations reduces or eliminates differential thermal expansion effects, e.g., deflections, growth, among such localized areas of the gearbox housing, thereby minimizing or eliminating induced spatial misalignments between the central bull gear and the corresponding bull pinion(s). The system of the present invention is operative to reduce bull gearing vibration levels regardless of the operating temperature (oil-in temperature) of the transmission gearbox. The system utilizes fluid spray means such as one or more adjustable oil jets to provide cooling/heating of respective localized areas of the gearbox housing to selectively control the differential thermal expansion rates of the upper conical casing and the lower base casing of the gearbox housing (by effectively nulling the temperature variations among such respective localized areas).

The present invention may also be utilized to heat or cool selected localized areas of the gearbox housing to compensate for gearing misaligments arising from minor manufacturing discrepancies, e.g., to align gears in gearbox housings that have misaligned bearing bores or that do not have optimal tooth profiles. Bull pinions may be formed with modified tooth profiles to compensate for average degrees of misalignment from torque loading, which may induce gearbox housing deflections. Oil jets may be utilized to heat/cool selected localized areas of the transmission gearbox housing to counteract gearing misalignments due to less than optimal gearing tooth profiles or less than optimal control of dimensional tolerances of gearbox bearing bores.

The transmission gearbox noise control system of the present invention includes one or more metering valves, a spray rod mounted in combination with each metering valve, an oil reservoir, an oil pathway for fluidically interconnecting the oil reservoir and each metering valve, means for circulating oil from the oil reservoir to each metering valve, and means for regulating the operation of each metering valve. The system is adapted to utilize existing feature of transmission gearboxes. For example, the system may utilize the excess oil capacity, the fluid circulation pump(s), and the existing fluid flow paths of the transmission lubrication subsystem.

Each metering valve is removably mounted in combination with either the upper or lower casing of the gearbox housing. Disposed in combination with each metering valve is a spray rod, which is configured to provide a fluid jet having a predetermined impingement pattern. Each metering valve is mounted in combination with the gearbox housing so that the corresponding spray rod is orientated to discharge the fluid jet to impinge upon a predetermined target area of the gearbox housing. In general, the predetermined target area will be selected internal wall regions of the upper or lower casing comprising the gearbox housing, i.e., selected localized areas of the gearbox housing, immediately adjacent the structural members that support the central bull gear or the bull pinion(s) in an aligned meshing relation. Maintaining such localized areas at substantially equivalent temperatures by means of the cooling-/heating action of the discharged fluid effectively nulls or adjusts temperature variations among such localized areas, thereby effectively negating growth and/or deflections in the gearbox housing, which results in the abatement of interior noise levels.

The functioning of the transmission gearbox noise control system is controlled via the regulating means which is operative to initiate/terminate operation of each metering valve, to regulate the fluid flow rate therethrough, and/or to adjust the impingement pattern of the discharged fluid jet. The regulating means may be an automatic subsystem controlled by an on-board computer or a manual subsystem operated by the pilot. Alternatively, the regulating means may be utilized to optimize operation of the metering valves during the Acceptance Testing Procedure. Vibration levels would be measured during Acceptance Testing, and individual metering valves adjusted, e.g., flow rates, impingement patterns, so as to minimize vibration levels during operation of the transmission gearbox.

The transmission gearbox noise control system of the present invention is activated during normal operations of the transmission system to abate noise levels emanating therefrom. Upon activation, the regulating means is operative to initiate operation of the metering valves to cause fluid flow therethrough. The fluid flow through the metering valves, preferably provided by diverting excess fluid circulating in the transmission lubrication system, i.e., the oil being circulated from the oil reservoir through the oil flow pathways by the fluid circulation pump(s), is discharged through the corresponding spray rods so that the fluid jet impinges upon selected target (localized) areas of the gearbox housing. The heat transfer effects provided by the impinging fluid jet, i.e., cooling or heating of the selected target areas, effectively nulls or adjusts temperature variations among such localized areas. This eliminates differential thermal expansion effects, i.e., deflections, growth, in the gearbox housing, which effectively minimizes or eliminates relative spatial misalignment(s) between the central bull gear and the corresponding bull pinion(s). This reduces or eliminates bull gearing vibration levels, and in consequence, interior noise levels. Continuous monitoring of interior noise levels during normal operations of the transmission system provides feedback signals to the regulating means, which is operative in response thereto to control the functioning of the transmission gearbox noise control system, e.g., increasing or decreasing fluid flow rate through one or more of the metering valves, to effectively minimize interior noise levels.

BRIEF DESCRIPTION OF THE DRAWINGS

A more complete understanding of the present invention and the attendant features and advantages thereof may be had by reference to the following detailed description when considered in conjunction with the accompanying drawings wherein.

DETAILED DESCRIPTION OF PREFERRED EMBODIMENTS

A research program was conducted by Sikorsky Aircraft to provide a more fundamental understanding of the effects of the design and operating parameters of an S-76 ® main transmission gearbox vis-a-vis bull gearing vibration generation. Operating parameters investigated included main rotor and tail rotor torque, speed, oil temperature, oil type, oil distribution, oil service level, and temperature effects on the gearbox housing. Housing temperature effects were investigated in light of the fact that the main transmission gearbox housing of the S-76 ® helicopter series is generally fabricated from magnesium or magnesium alloys (for weight savings), which have a coefficient of thermal expansion more than twice as great as the steel reduction gearing of such transmissions (about $14.5 \times 10^{-6}$ in/in/°F. versus $6.33 \times 10^{-6}$ in/in/°F.).

Test results revealed that variations in oil service levels and modifications in oil distribution systems produced no noticeable effects on bull gearing vibration levels. Comparisons of Mil-spec petroleum-based oils, nonpetroleum-based synthetic oils, and commercial oils indicate that small reductions in bull gearing vibration levels could be achieved using Mil-spec type oils. The noise abatement effects produced by utilizing such Mil-spec type oils, however, were inconsistent with respect to various harmonics of the bull gearing vibration spectrum.

Tail rotor take-off torque data indicated a linear increase in bull gearing vibration levels of about 0.8 Db per ten percent increase in tail rotor torque over the range of forty to one hundred percent of full rating. Test data also showed that bull gearing vibration levels generally increased as expected with increases in torque at equivalent speeds. Test data further showed a pronounced rise in bull gearing vibration levels with increases in speed (at given torque settings) from about 90% $N_r$ to 107% $N_r$.

Test data reveals, however, that operating temperature has the most significant impact on main transmission gearbox vibration generation. Test results indicate that bull gearing vibration levels increase approximately 0.1 dB per degree Celsius increase in oil-in temperature to the gearbox (the baseline oil-in temperature of the S-76 ® main transmission gearbox is about 160° F.(71° C.)). In contrast, the vibration levels of the S-76 bevel gearing stage exhibit a decreasing trend with increases in oil-in temperature while the vibration levels of the helical gearing stage show no constant trend with changes in oil-in temperature. Since the bevel gears are mounted on corresponding bull pinion shaft assemblies, the foregoing effects indicate that decreases in oil viscosity with increasing temperature are not significantly affecting bull gearing vibration generation.

Based upon the inconclusive nature of the aforedescribed effects of operating temperature, a NASTRAN finite element model of the S-76 ® main transmission gearbox housing was developed to examine gearbox housing thermal expansion/deflection effects due to operating temperature. Localized surface areas of the upper and lower casings of the gearbox housing were instrumented to provide temperature data for selected housing surface areas. Test data indicates that temperature variations of about 0° C. to about 4° C. exist across such localized surface areas of the upper casing of the gearbox housing, that temperature variations of about 0° C. to about 5° C. exist across such localized surface areas of the lower casing of the gearbox housing, and that temperature variations of about 0° C. to about 8° C. exist for corresponding localized surface areas between the upper and lower casings of the gearbox housing.

These temperature variations are due primarily to the disposition of the S-76 ® main gearbox housing with respect to the helicopter airframe. The upper casing of the gearbox housing is exposed to environmental operating conditions while the lower casing is shrouded within the helicopter airframe. Thus, the upper casing of the gearbox housing is subjected to different convective and radiative heat transfer effects than the lower casing such that the upper casing of the gearbox housing has lower overall temperatures than the lower casing in general.

The temperature variations across such localized areas of the upper and lower casings, respectively, produce differential thermal expansion effects in the corresponding upper and lower casings of the gearbox housing, i.e., respective localized areas of the upper and lower casings of the gearbox housing experience different rates of thermal expansion (growth; deflections). In addition, the temperature variations of corresponding localized areas of the upper and lower casings produce differential thermal expansion effects between the upper and lower casings.

Such differential thermal expansions of the gearbox housing produce diverse effects. To facilitate a better understanding of the effects of differential thermal expansion in bull gearing vibration generation, reference is made to FIGS. 3A, 3B which illustrate an S-76® main transmission gearbox 100. The gearbox 100 comprises a housing 102 formed by an upper conical casing 104 secured in combination with a lower base casing 106 by means of bolts 108. The transmission housing 102 is typically machined from high strength-to-weight ratio materials such as AZ 91C or ZK 60A magnesium alloys. A central bull gear 110 is mounted for rotation within the gearbox housing 102 by means of support bearings 112 disposed in combination with upper and lower stub axles 114, 116, respectively. Ends of the upper and lower stub axles 114, 116 are connected to the upper conical casing 104 and the lower base casing 106, respectively.

Figure 3A:
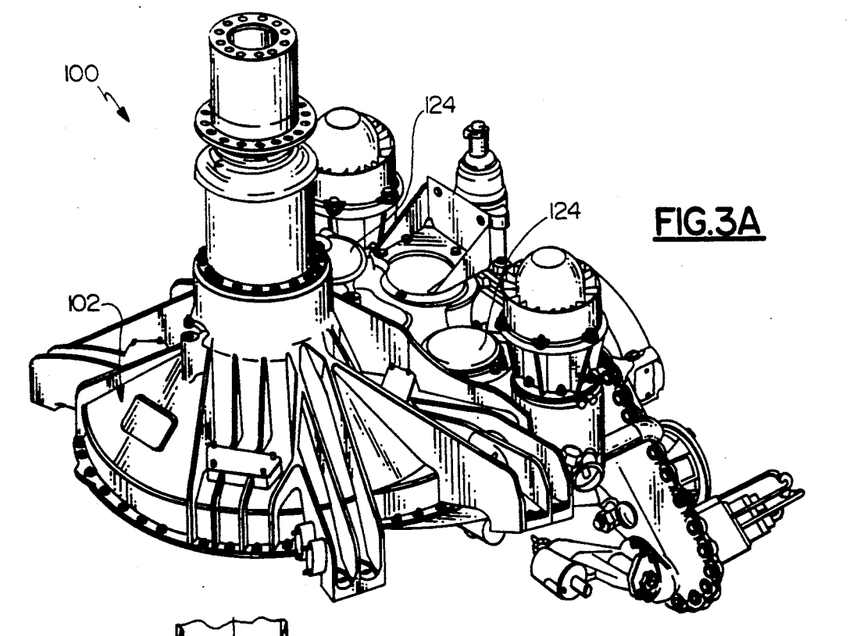
FIG. 3A is an external perspective view of an S-76 ® main transmission gearbox.
Figure 3B:
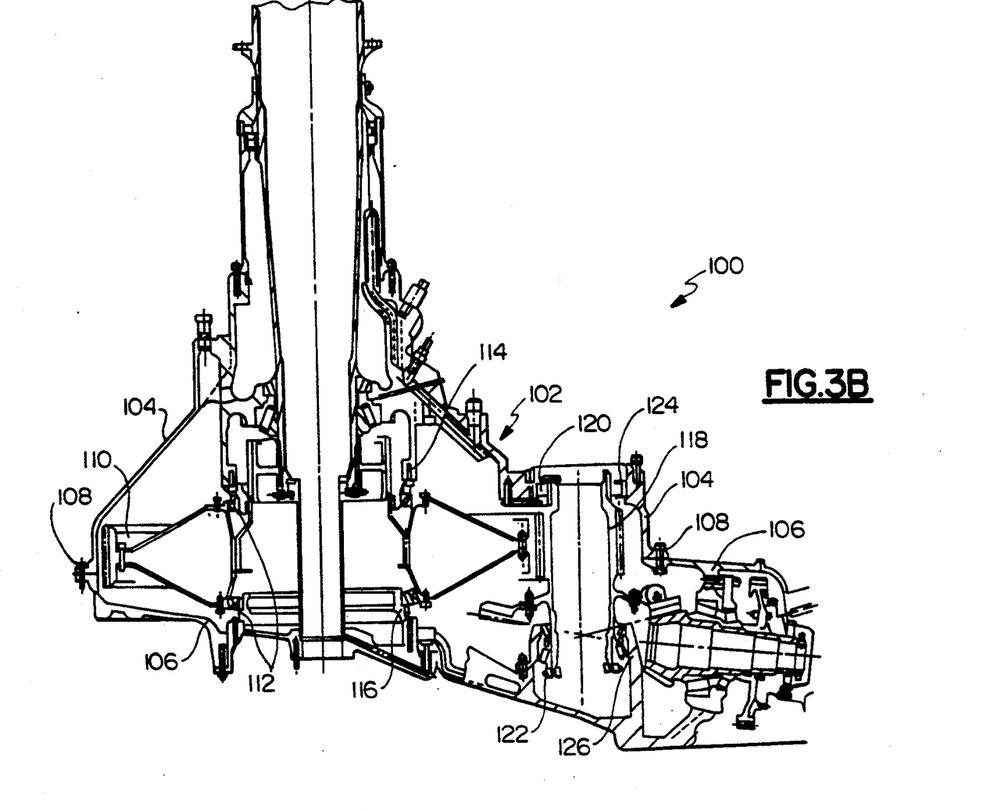
FIG. 3B is a internal cross-sectional view of the gearbox of FIG. 3A.

Two bull pinions 118 are mounted for rotation within the gearbox housing 102 by means of pinion bearings 120, 122 disposed in combination with upper and lower pinion supports 124, 126, respectively. Ends of the upper and lower pinion supports 124, 126 are connected to the upper conical casing 104 and the lower base casing 106, respectively.

Differential thermal expansion of localized areas of the upper conical casing 104 and/or the lower base casing 106 of the gearbox housing 102 causes relative displacements among the upper stub axle 114, the lower stub axle 116, the upper pinion support 124, and/or the lower pinion support 126, and in consequence, the bull pinions 118 and the central bull gear 110. Such displacements directly affect the spatial orientations (meshing interactions) between the central bull gear 110 and the bull pinions 118. This, in turn, induces mismeshing between the teeth of the central bull gear 110 and the bull pinions 118, which results in increases in bull gearing vibration levels.

The NASTRAN finite element model indicates that differential thermal expansion of respective localized areas of the magnesium gearbox housing produces relative radial displacements between the centerlines of the left and right bull pinions and the central bull gear by about 0.027 and 0.023 inches, respectively, at a stabilized oil-in temperature of about 160° F. (71° C.). The predicted displacements increase to about 0.043 and 0.034 inches, respectively, at an oil-in temperature of about 230° F. (110° C.).

While the steel gearing also experiences some thermal expansion (about 0.010 inches at 160° F.), there is still a displacement disparity sufficient to induce spatial misalignment(s) between the central bull gear and the corresponding bull pinion(s). As a result, the bull gearing operating contact ratios decrease to a value of about 1.52 (versus a design contact ratio value of about 1.60). Vibration generation due to bull gearing mismeshing increases with increasing deviance between the design contact ratio and the effective operating contact ratio.

Figure 4:
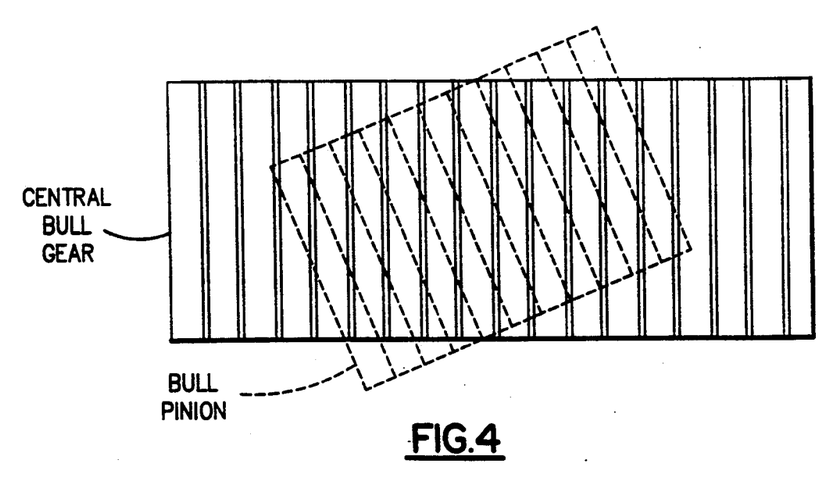
FIG. 4 depicts canting between the central bull gear and the bull pinion of FIG. 2 induced by differential thermal expansion of the gearbox housing.

In addition to the differential thermal expansion effect described in the preceding paragraph, i.e., relative radial displacements, differential thermal expansion may induce canting between each bull pinion 118 and the central bull gear 110, as illustrated in FIG. 4 (exaggerated for purposes of illustration) as contrasted with the idealized meshing relationship illustrated in FIG. 2A. The bull gearing is designed for simultaneous meshing engagement across the face width of respective teeth of each bull pinion and the central bull gear. The induced canting between the bull pinions and the central bull gear, as a result of differential thermal expansions of localized areas of the gearbox housing, causes respective teeth to meshingly engage over only a portion of the face width. Induced canting also increases the vibration levels generated by the bull gearing.

Research has shown that there is a direct correlation between transmission gearbox operating temperatures and gearbox vibration generation. Normal gearbox operating temperatures are sufficient to cause differential thermal expansion of localized areas of the gearbox housing. This, in turn, induces spatial misalignments between the central bull gear and the corresponding bull pinion(s), resulting in increased vibration levels.

Figure 5:
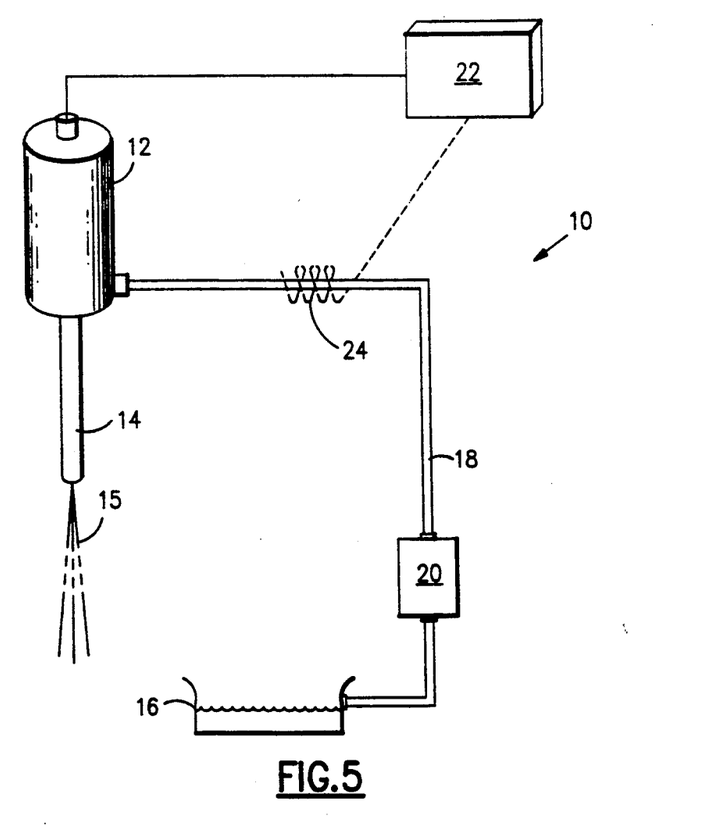
FIG. 5 is a schematic representation of a transmission gearbox noise control system according to the present invention.

To abate such bull gearing vibration levels, a transmission gearbox noise control system 10 according to the present invention is operative to mitigate gearbox housing differential thermal expansion effects, i.e., to reduce or eliminate temperature variations among respective localized areas of the gearbox housing. Effectively nulling such temperature variations reduces or eliminates differential thermal expansion effects, e.g, deflections, growth, among such localized areas of the gearbox housing, thereby minimizing or eliminating induced relative displacements of the upper and lower stub axles and/or the upper and lower pinion supports. The net effect of operation of the system 10 is to effectively minimize relative spatial misalignment(s) between the central bull gear and the bull pinion(s), i.e., reduce any temperature-induced disparity between the design contact ratio and the effective contact ratio of the transmission gearbox, thereby abating bull gearing vibration levels. The system 10 of the present invention is operative to abate bull gearing vibration levels regardless of the operating temperature (oil-in temperature) of the transmission gearbox. The system 10 utilizes fluid spray means such as one or more adjustable oil jets to provide cooling/heating of respective localized areas of the gearbox housing to selectively control the differential thermal expansion rates of the upper conical casing and the lower base casing of the gearbox housing (by effectively nulling the temperature variations among such respective localized areas).

The transmission gearbox noise control system 10 of the present invention is adapted to utilize existing features of transmission gearboxes. For co example, the transmission gearbox 100 of an S-76® helicopter includes a lubrication subsystem for lubricating and cooling the gearing and bearings comprising the transmission to prevent premature wear out thereof. The lubrication subsystem includes an oil sump (formed in the lower base casing 106) with an excess oil capacity. This excess oil capacity may be utilized to provide the requisite working fluid for the fluid spray means of the system 10 of the present invention. Disposed within the S-76® oil sump are two fluid circulation pumps (to circulate oil from the oil sump via a transmission oil cooler to the transmission gearing and bearings), which may be utilized to provide the necessary fluidic pressure for operation of the system 10.

The S-76® lubrication subsystem further includes fluid flow paths in the form of cores (oil flow paths preformed in the separate casings of the gearbox housing) or external tubing to circulate oil from the oil sump onto the gearing and bearings for lubrication and cooling thereof. These existing fluid flow paths may be tapped to divert oil from the lubrication subsystem for utilization in the system 10 of the present invention. The amount of oil flow diverted for utilization by the system 10 (about 0.1 gal/min per metering valve versus about 20 gals/min for the lubrication subsystem) will not adversely affect the functioning of the S-76 ® lubrication subsystem.

The functional elements of the transmission gearbox noise control system 10 according to the present invention are schematically illustrated in FIG. 5. The system 10 includes one or more metering valves 12, a spray rod 14 mounted in combination with each metering valve 12, an oil reservoir 16, an oil pathway 18 for fluidically interconnecting the oil reservoir 16 and each metering valve 12, means 20 for circulating oil from the oil reservoir 16 through the oil pathway 18 to each metering valve 12, and means 22 for regulating the operation of each metering valve 12.

As discussed hereinabove, elements of a transmission lubrication subsystem may be incorporated as functional elements of the system 10. For example, the system 10 may incorporate the oil sump of the transmission lubrication subsystem to function as the oil reservoir 16 for the system 10, i.e., the system 10 utilizes the excess oil capacity of the transmission lubrication subsystem to provide the working fluid required by the system 10. Similarly, the fluidic pressure source of the transmission lubrication system, e.g., the fluid pump(s), may be utilized to provide the fluidic working pressure for the system 10.

Preferably, the fluid flow pathways of the transmission lubrication subsystem are utilized as part of the oil pathway 18 of the system 10. It may be necessary to provide supplemental fluid flow paths, i.e., by tapping into the primary fluid flow paths of the transmission lubrication subsystem with piping or tubing, to fluidically interconnect each metering valve 12 to the lubrication subsystem fluid flow pathways.

Each metering valve 12 of the system 10 is removably mounted in combination with the upper conical casing 104 or the lower base casing 106 of the gearbox housing 102. The parameters defining the mounting locations of the metering valves 12 are discussed hereinbelow in further detail. The body of each metering valve 12 projects externally from the gearbox housing 102 to facilitate replacement, repair, and/or modification of the system 10. Preferably, each metering valve 12 is adjustable, via operation of the regulating means 22, so that fluid flow rate therethrough may be regulated, i.e., increased or decreased as required to provide the requisite degree of cooling or heating to effectively nullify temperature variations in the gearbox housing 102. Metering valves of the type known to those skilled in the art may be utilized in the system 10 of the present invention, provided such valves are compatible with the operating environment of the transmission gearbox.

A spray rod 14 is disposed in combination with each metering valve 12 so as to project inwardly into the gearbox housing 102. Each spray rod 14 is configured to provide a fluid jet 15 having a predetermined impingement pattern, e.g., within the range from diffuse (large localized area) to concentrated (small localized area), depending upon the fluid flow rate through the metering valve 12 and the degree of cooling/heating (conductive heat transfer) to be effected by the fluid jet 15. One embodiment of a spray rod 14 has a cylindrical external configuration and a cylindrical internal fluid flow channel having an internal diameter of about 0.040 inches. Other configurations for the internal fluid flow channel of the spray rods 14 may be utilized to provide different impingement patterns. Alternatively, each spray rod 14 may incorporate an adjustable nozzle (similar in functional capability to the spray nozzles utilized on garden hoses), which is controllable via the regulating means 22, so that each spray rod 14 is adjustably operative to provide a variable impingement pattern.

Figure 6:
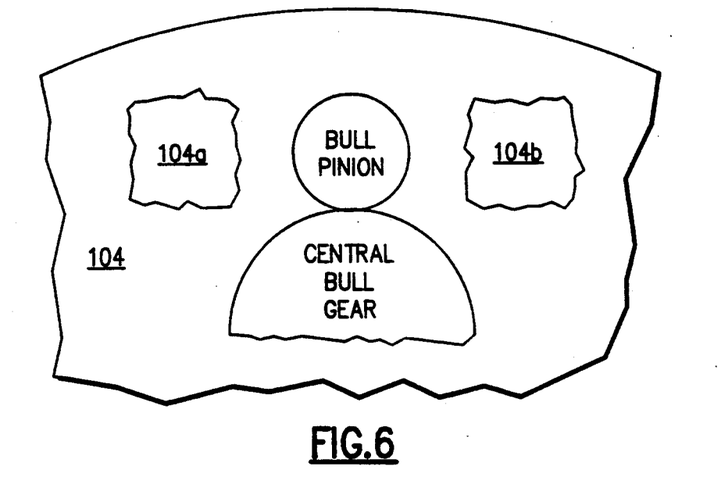
FIG. 6 illustrates a representative target area for the fluid discharge of the transmission gearbox noise control system of the present invention.

Each metering valve 12 is mounted in combination with the gearbox housing 102, and the corresponding spray rod 14 orientated (aimed), so that the fluid jet 15 discharging therefrom impinges upon a predetermined target area of the gearbox housing 102, such as localized internal areas 104a or 104b (representative of portions of the upper conical casing 104 on adjacent sides of the connected end of an upper pinion support 124) as shown in FIG. 6. In general, the predetermined localized internal areas that are targeted will be internal housing wall regions of the upper conical casing 104 and the lower base casing 106 immediately adjacent a gear support member, i.e., adjacent the connected ends of an upper or lower stub axle 114, 114 or pinion support 124, 126. Maintaining such localized areas at substantially equivalent temperatures by the heat transfer effects (cooling/heating action) of the fluid jets 15 effectively nulls temperature variations among such localized areas, thereby effectively negating growth and/or deflections in the gearbox housing, which results in the abatement of interior noise levels.

The functioning of the transmission gearbox noise control system 10 may be controlled via the regulating means 22. The regulating means 22 is operative to initiate/terminate operation of each metering valve 12 of the system 10, to regulate the fluid flow rate therethrough, and/or to adjust the setting of the adjustable nozzles of each metering valve 12 so equipped. The regulating means 22 may be an automatic subsystem or a manually operated subsystem. For an automatic regulating means 22, appropriate sensors such as thermocouples mounted to the gearbox housing 102, audiometers installed in the cockpit and/or cabin of the helicopter, etc., provide input signals to an on-board computer, e.g., the Automatic Flight Control System, which provides output signals to control the operation of the metering valves 12. For a manually operated regulating means 22, appropriate devices such as ON/OFF switches, rheostats, etc., are installed in cockpit and accessible for pilot manipulation as required (based upon audio tones received by the pilot) to control the operation of the metering valves 12.

Alternatively, the operation of the metering valves 12 may be adjusted during the Acceptance Testing Procedure such that a feedback system is not required. Vibration levels of the localized areas of the gearbox housing 102 would be measured during Acceptance Testing or during flight operations. The metering valves 12 would be then calibrated, i.e., adjusted to provide sufficient flow rates, impingement patterns, after shutdown of the transmission gearbox 100 to provide fluid jets 15 that would minimize the vibration levels of the gearbox housing 102. The regulating means 22 would then be manually operatable as an ON/OFF switch to actuate the calibrated metering valves 12 during subsequent flight operations to minimize vibration levels. The foregoing procedure may be reiterated as necessary to achieve minimum vibration levels.

In addition to the foregoing elements, the transmission gearbox noise control system 10 of the present invention may also include a means 24 for heating the oil provided to each metering valve 12. The heating means 24 may be a device such as a resistance heating coil, disposed in interactive combination with the oil pathway 18, to raise the temperature of the oil flowing therethrough above the oil-in temperature (stabilized oil-in temperature of about 160° F. (71° C.) for S-76 ® gearboxes) for those applications wherein it is necessary to heat selected localized areas of the gearbox housing 102. The heating means 24 is interconnected to the regulating means 22, which is operative to control the operation thereof. Alternatively, oil flow may be provided directly from the oil sump (where it usually has the highest temperature), rather than being diverted after it has been cooled by passing through the transmission oil cooler, to provide oil jets for heating selected localized areas of the transmission gearbox housing 102.

The transmission gearbox noise control system 10 of the present invention is activated during normal operations of the transmission system to abate noise levels emanating therefrom. Normal operation of a transmission system is generally indicated by a stabilized oil-in temperature condition in the transmission gearbox (for S-76 ® helicopters, oil-in temperature stabilization occurs about ten minutes after the initial on-power reading). Transient vibrations emanating from the transmission gearbox during engine start up and warm up may generally be ignored.

Upon activation of the transmission gearbox noise control system 10, the regulating means 22 is operative to initiate operation of the metering valves 12 to cause fluid flow therethrough. The fluid flow through the metering valves 12, preferably provided by diverting excess fluid circulating in the transmission lubrication system, i.e., the oil being circulated from the oil sump through the transmission oil cooler and then through the fluid flow paths by the fluid circulation pump(s), is discharged through the corresponding spray rods 14 so that the fluid jet 15 impinges upon selected target (localized) areas of the gearbox housing 102. The heat transfer effects provided by the impinging fluid jet, i.e., cooling or heating of the selected target areas, effectively nulls or adjusts temperature variations among such localized areas. This eliminates differential thermal expansion effects, i.e., deflections, growth, in the gearbox housing, which effectively minimizes or eliminates relative spatial misalignment(s) between the central bull gear and the corresponding bull pinion(s). This reduces or eliminates bull gearing vibration levels, and in consequence, interior noise levels. Continuous monitoring of interior noise levels during normal operations of the transmission system provides feedback signals (e.g., audiometer signals or audio tones) to the regulating means 22, which is operative in response thereto to control the functioning of the transmission gearbox noise control system 10, e.g., increase or decrease fluid flow rate through the metering valves 12, to maintain the interior noise levels at a minimal level.

The transmission gearbox noise control system 10 according to the present invention has the capability of reducing interior noise levels in S-76 helicopters by at least 2-3 dB.

In addition to providing noise abatement due to differential thermal expansions of the gearbox housing as described hereinabove, the transmission gearbox noise control system 10 of the present invention may operate to alleviate other conditions that may cause misalignments between the central bull gear and the bull pinion(s) that generate high frequency vibrations. The torque transmitted to the respective gear members causes applied forces to be exerted against such gear members. This phenomenon is known as "torque loading", and is counteracted by supporting each gear member by opposed bearing assemblies that are rigidly secured to the transmission gearbox housing so that such applied forces are coupled into the gearbox housing. The torque loads coupled into the gearbox housing are usually of sufficient magnitude to cause localized deflections thereof. The net effect of such deflections is that mechanically coupled gear members become canted with respect to one another, i.e., misaligned, as illustrated in FIG. 4.

Another condition that may produce gearing misalignment involves the manufacturing techniques utilized to produce transmission gearbox housings. Gearbox housings are customarily formed by independently machining top and bottom casings that are subsequently rigidly secured in combination to form the gearbox housing. Holes for the bearing assemblies for the respective gear members are also independently machined in the top and bottom casings. Due to manufacturing and machining tolerances that may occur from independently forming the top and bottom casings and/or the respective holes for the bearing assemblies, misalignments may occur between corresponding hole pairs in the top and bottom casings. Bearing assemblies disposed in such holes are not properly orientated to support the corresponding gearing in an aligned meshing relation. As a result, such mechanically coupled gearing may be misaligned, which will cause the generation of high frequency vibrations during operation of the transmission system.

As a general rule, gear misalignments of the type described in the immediately preceding paragraphs may be detected and corrected during acceptance testing (prior to release of the helicopter). Sound pressure level readings in the cockpit and/or cabin that exceed a predetermined level during operation of the transmission system may be indicative of one of the foregoing gear misalignment conditions (or differential thermal expansion effects). Misalignments between such gearing have typically been rectified by "helix correction", a technique wherein the teeth of one of the gear members is machined to bring them into alignment with the teeth of the corresponding gear member. For example, the teeth of the bull pinion may be machined to bring them into alignment with the teeth of the central bull gear (regardless of whether misalignment was due to canting of the central bull gear, the corresponding bull pinion(s), or a combination of both). The bull pinion has fewer teeth than the central bull gear so less machining is required to negate the canting induced by the abovedescribed conditions.

It will be appreciated, however, that the "helix correction" technique is both labor intensive and time consuming. The bull gearing must be removed from the transmission gearbox, machined, reinstalled, and the assembled transmission gearbox retested for acceptable sound pressure level readings. This operation may have to be repeated to achieve acceptable readings. Utilizing the transmission gearbox noise control system of the present invention to effectively nullify the localized deflections of torque loading and/or exceedance of specified tolerances may prove advantageous in reducing the labor and time required for acceptance testing.

A variety of modifications and variations of the present invention as described hereinabove are possible in light of the above teachings. It is therefore to be understood that, within the scope of the appended claims, the present invention may be practiced otherwise than as specifically described hereinabove.

What is claimed is:

1. In combination with a transmission system including a gearbox housing having rotatably mounted therein a gearing reduction stage that includes a central bull gear and at least one bull pinion intermeshing therewith, and wherein the gearbox housing and the gearing reduction stage are formed from disparate metals having dissimilar coefficients of thermal expansion, a transmission gearbox noise control system for abating noise emanating from the gearing reduction state due to spatial misalignment between the central bull gear and the at least one bull pinion, comprising:

means for providing a working fluid;
means for discharging said working fluid as a jet to impinge upon selected internal localized areas of the gearbox housing; and
means for regulating operation of said discharging means wherein said discharged working fluid effectively nulls temperature variations among said selected internal localized areas of the gearbox housing to effectively minimize temperature-induced spatial misalignment in the gearing reduction stage such that noise emanating from the gearing reduction stage is abated.

2. The transmission gearbox noise control system of claim 1 wherein said discharging means comprises a plurality of metering valves, each metering valve having s spray rod mounted in fluidic combination therewith, each metering valve being removably mounted in combination with the gearbox housing wherein said discharged working fluid from said corresponding spray rod impinges upon one of said selected internal working areas of the gearbox housing.

3. The transmission gearbox noise control system of claim 2 wherein each said spray rod has a predetermined internal configuration such that said discharged working fluid therefrom has a predetermined impingement pattern upon said one of said selected internal working areas of the gearbox housing.

4. The transmission gearbox noise control system of claim 2 wherein each said spray rod has an adjustable nozzle such that said discharged working fluid has one of several different predetermined impingement patterns.

5. The transmission gearbox noise control system of claim 1 wherein said regulating means is operative to initiate and terminate operation of said discharging means and to regulate flow of said working fluid through said discharging means.

6. The transmission gearbox noise control system of claim 4 wherein said regulating means is operative to adjust said adjustable nozzle of said spray rod means such that said discharged working fluid has one of said several different predetermined impingement patterns.

7. The transmission gearbox noise control system of claim 1 wherein said providing means includes an fluid reservoir to hold said working fluid, a fluid pathway for fluidically interconnecting said fluid reservoir and said discharging means, and means for circulating and cooling said working fluid to said discharging means.

* * * * *